Oct. 16, 1928.
T. S. DUNCAN
1,687,646
VALVE AND COCK
Filed Feb. 16, 1927
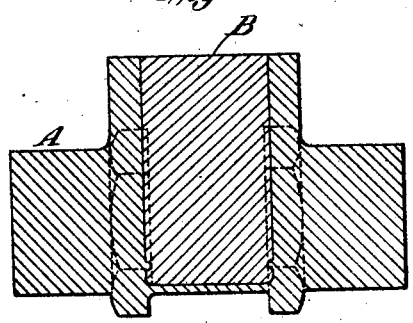
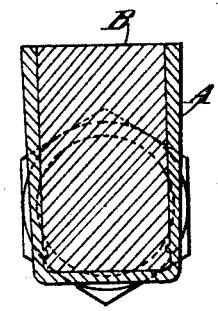
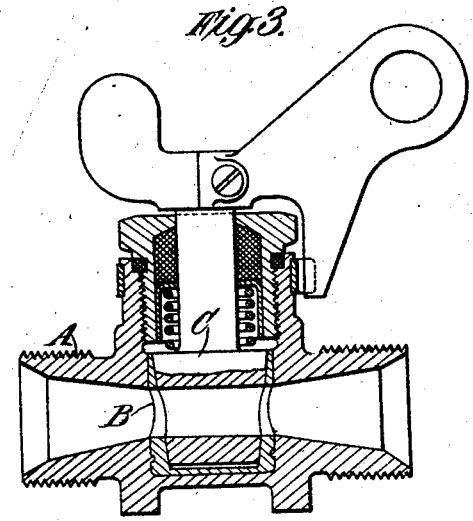
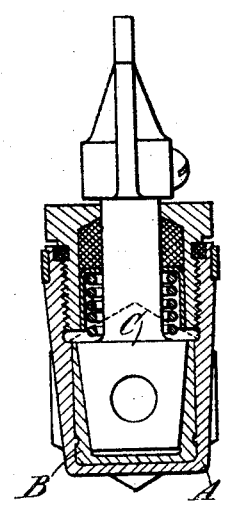
Inventor
Thomas Smith Duncan
By
Pennie, Davis, ...
Attorneys Patented Oct. 16, 1928.

1,687,646

UNITED STATES PATENT OFFICE.

THOMAS SMITH DUNCAN, OF WESTMINSTER, LONDON, ENGLAND, ASSIGNOR TO VICKERS LIMITED, OF WESTMINSTER, ENGLAND, A BRITISH COMPANY.

VALVE AND COCK.

Application filed February 16, 1927, Serial No. 168,581, and in Great Britain February 18, 1926.

This invention relates to valves and cocks made principally of aluminium alloys or of other light metals such as magnesium and its alloys.

While the use of such metals for the bodies of valves and cocks is desirable for the purpose of reducing weight, as for example when the valves and cocks are used in aircraft, it is found that these soft metals are liable to tear at the bearing surface when dry, and to seize under certain conditions, and it is therefore desirable to provide a working surface of a different metal which will avoid these disadvantages.

According to this invention an element composed of a metal suitable for constituting a working surface or valve seat and different from that forming the body or casing of the valve or cock is inserted in the blank intended for the production of the said body or casing and after the latter has been forged to shape together with the inserted element the working surface or valve seat is formed in the said element by a boring or other suitable operation. In this manner a very efficient interconnection is obtained between the two metals and is such as to prevent leakage of liquid such as petrol between them.

In order that the said invention may be clearly understood and readily carried into effect, the same will now be described more fully with reference to the accompanying drawings illustrating an exemplification of this invention as applied to a petrol cock.

Figures 1 and 2 represent transverse sections taken at right angles to each other through the stamping intended for the cock body.

Figures 3 and 4 represent transverse sections taken at right angles to each other through the finished cock.

The light metal stamping A is made in the ordinary way but is left slightly oversized; it is then bored out and a turned plug B of a different metal such as brass or other non-ferrous alloy suitable for constituting a working surface is forced into the hole therein. The stamping is then returned to the drop hammers and after a preliminary heating is placed in dies and finally forged to shape. The contact between the two metals is extremely close and the slight irregularity of shape imparted to the plug B in the final hammering renders it impossible for the plug to turn or to be drawn out. The plug B is then bored to provided the seating or working surface for the valve member C.

What I claim and desire to secure by Letters Patent of the United States is:—

A method of making the bodies of cocks and valves mainly composed of light metal, comprising inserting in a body blank an element consisting of a different metal suitable for constituting a valve seat, forging the body blank together with the inserted element into shape, and forming a valve seat in the material of said element by a suitable operation such as boring.

THOMAS SMITH DUNCAN.